(12) United States Patent
Villa et al.

(10) Patent No.: US 7,372,626 B2
(45) Date of Patent: May 13, 2008

(54) DEVICE FOR SEQUENTIAL OBSERVATION OF SAMPLES AND METHODS USING SAME

(75) Inventors: Pascal Villa, Cassis (FR); Michel Delaage, Marseille (FR); Toni Williamson, Cassis (FR)

(73) Assignee: Trophos, Marseille Cedex (FR)

( * ) Notice: Subject to any disclaimer, the term of this patent is extended or adjusted under 35 U.S.C. 154(b) by 680 days.

(21) Appl. No.: 10/276,245

(22) PCT Filed: May 10, 2001

(86) PCT No.: PCT/FR01/01412

§ 371 (c)(1),
(2), (4) Date: Nov. 14, 2002

(87) PCT Pub. No.: WO01/88593

PCT Pub. Date: Nov. 22, 2001

(65) Prior Publication Data

US 2004/0224315 A1 Nov. 11, 2004

(30) Foreign Application Priority Data

May 15, 2000 (FR) .................................. 00 06125

(51) Int. Cl.
*G02B 21/26* (2006.01)
(52) U.S. Cl. ...................................... 359/391; 359/368
(58) Field of Classification Search ................ 359/368, 359/391
See application file for complete search history.

(56) References Cited

U.S. PATENT DOCUMENTS

| | | | | |
|---|---|---|---|---|
| 2,256,245 A | | 9/1941 | Fricke | |
| 3,720,812 A | * | 3/1973 | Downs | 377/10 |
| 3,734,593 A | * | 5/1973 | Mori | 359/376 |
| 4,600,389 A | * | 7/1986 | Schwartz | 433/217.1 |
| 5,308,983 A | * | 5/1994 | Milosevic et al. | 250/339.07 |
| 5,364,790 A | * | 11/1994 | Atwood et al. | 435/287.2 |
| 5,519,531 A | * | 5/1996 | Sato | 359/380 |
| 5,671,086 A | | 9/1997 | Fish et al. | |
| 5,689,063 A | * | 11/1997 | Fujiu et al. | 73/105 |

(Continued)

FOREIGN PATENT DOCUMENTS

CH 508 888 A 6/1971
FR 2 312 044 A 12/1976

*Primary Examiner*—Jill Warden
*Assistant Examiner*—Paul S Hyun
(74) *Attorney, Agent, or Firm*—Nixon & Vanderhye P.C.

(57) ABSTRACT

The invention concerns methods and devices for observing or analysing samples on a support. More particularly, it concerns a device for sequential observation of several samples arranged on a common plate (19) comprising an objective (15) for observing a stage (17) for positioning the plate (19) adapted to ensure a relative displacement between the plate (19) and the observation axis in a plane perpendicular to the observation axis, while leaving free the vertical displacement along the observation axis, means (21) for illuminating the sample and means (23, 25) for acquiring an image at the objective (15) output. It comprises a spacer (43) fixed relative to the objective (15) and having a support surface (45) on the support (19), said support surface being located proximate to the observation axis, so that said spacer (43) is adapted to maintain, on the observation axis, a constant distance between the objective (15) and the observation surface (29), during a relative displacement between the support (19) and the observation axis. The invention is useful for rapid analysis of cell samples.

28 Claims, 4 Drawing Sheets

Positioning the plate on the objective

U.S. PATENT DOCUMENTS 5,764,409 A     6/1998   Colvin
5,781,338 A *   7/1998   Kapitza et al. ............. 359/398
6,101,028 A *   8/2000   Heacock et al. ............ 359/368
6,268,959 B1 *   7/2001   Kawahito ................... 359/391

* cited by examiner

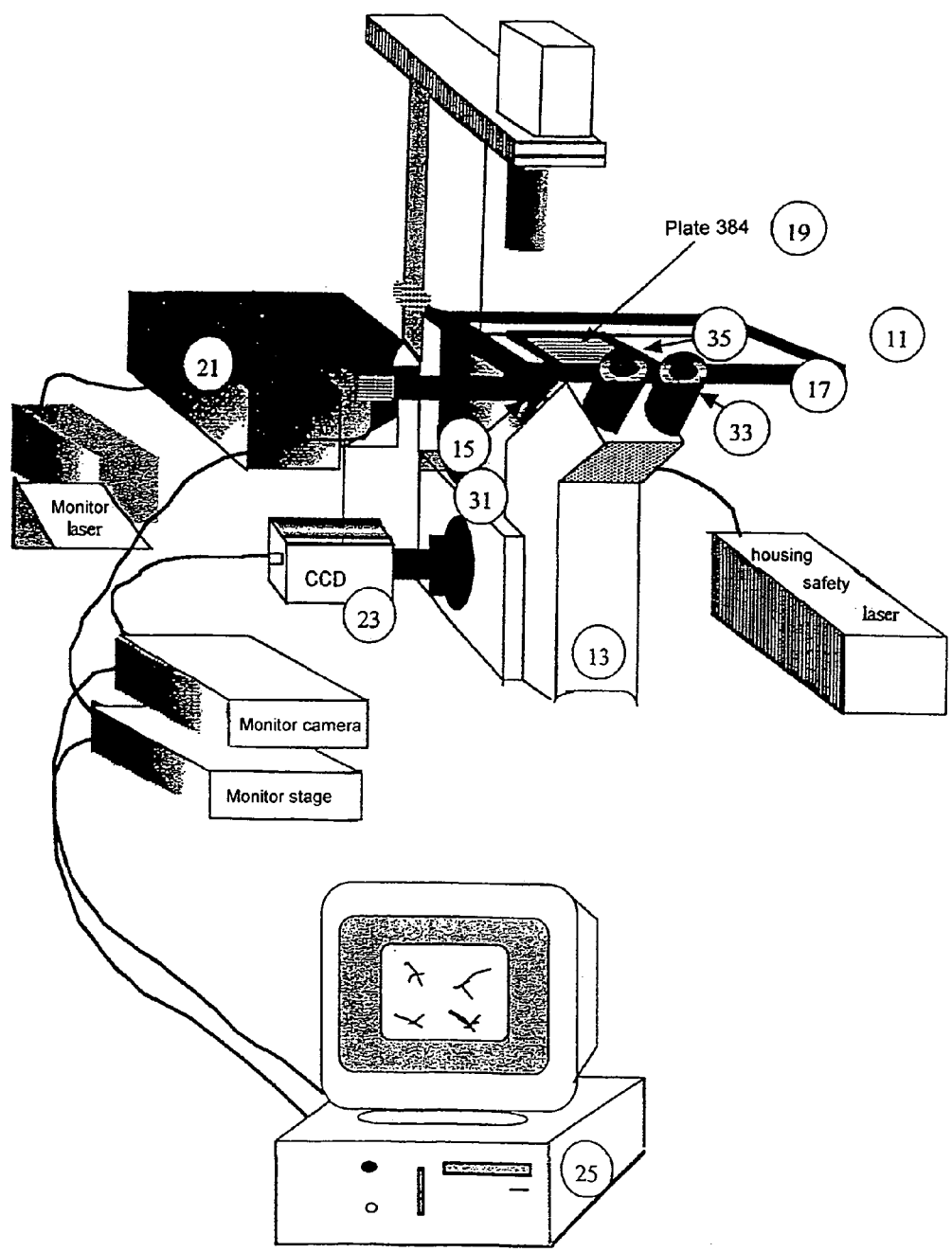
Figure 1 Device for analysing particles

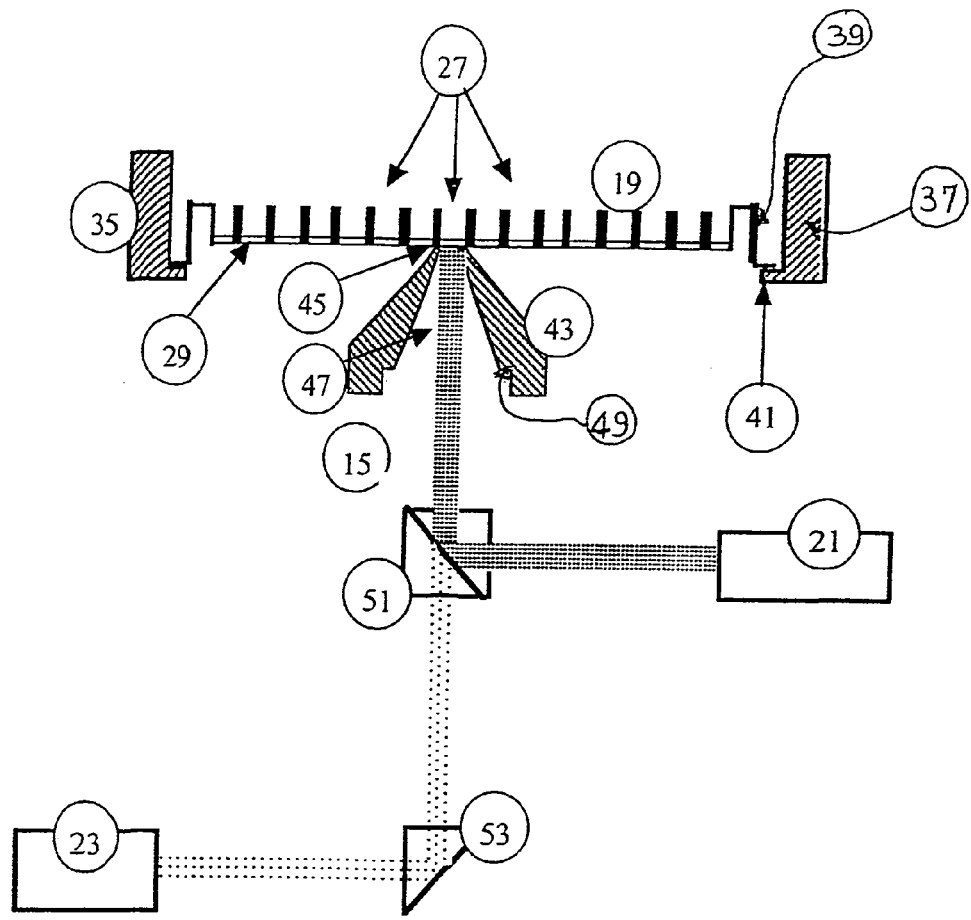
Figure 2  Positioning the plate on the objective

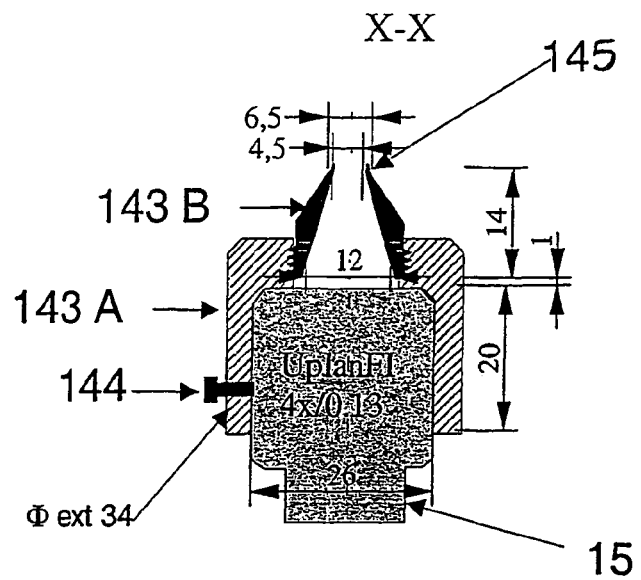
Figure 3: (dimensions in mm)
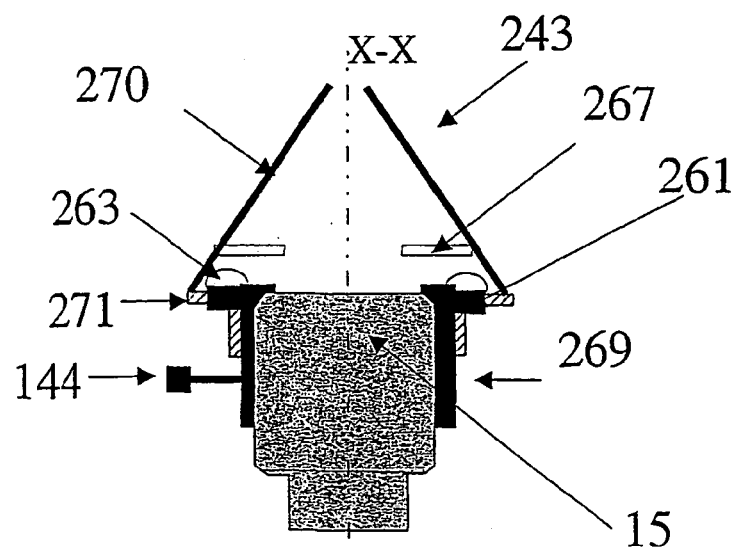
Figure 4

DEVICE FOR SEQUENTIAL OBSERVATION OF SAMPLES AND METHODS USING SAME

This application is the US national phase of international application PCT/FR01/01412 filed 10 May 2001, which designated the US.

BACKGROUND OF THE INVENTION

The present invention concerns methods and devices for observing or analysing samples on a support. More particularly, it concerns a device for sequential observation of several samples arranged side by side on a common support, notably a common plate.

Such device, notably of the microscope type, comprises an objective for observing at least part of a sample along an observation axis from an observation surface of the support and a stage for positioning the support adapted to ensure a relative displacement between the support and the observation axis in a plane perpendicular to the observation axis but leaving free the displacement along the presumed vertical observation axis. It further comprises means for illuminating at least part of a sample and means for acquiring an image at the objective output.

Such a device is used notably for rapidly analysing a large number of samples arranged on a common support, such as a plate, such samples being constituted, for example, of cells, in particular adherent, mammalian, prokaryotic, plant cells, etc. or other organisms, for instance pathogens (viruses, etc).

Rapid cellular analysis on a large number of samples is a necessity in the pharmaceutical industry, for high throughput screening of new active substances, and in the cosmetics industry, where cellular models are used to test new substances and control manufactures. These industries would like to make greater use of cellular tests and are asking that the implementation thereof be simplified.

The culture plates commonly used to hold biological (notably cellular) samples are generally tray-like in shape. They have a series of adjacent cells, called wells, in all or part of which is contained a sample. These wells are generally arranged in parallel axes to each other and extend along the thickness of the plate. They open at the top surface of the plate and are sealed by a bottom which generally forms the bottom surface of the plate. The bottoms of adjacent wells are therefore generally joined to one another. Thus, the bottom surface of the plate is essentially continuous. Other supports for the analysis of biological samples are for example membranes, glass slides, filters, or any other translucid or opaque support, etc.

To observe samples under a microscope, the plate (or any other support) is placed above or below the objective of the microscope whose axis is oriented vertically. Observation occurs through the bottom of each well, i.e. through the bottom surface of the plate, such bottom surface constituting the observation surface, or directly above the sample. The samples are brought one by one before the objective by displacing the plate in a plane perpendicular to the observation axis by means of a positioning stage. The latter is adapted to hold the plate primarily or solely at its periphery, thus leaving free the observation surface of the plate. In addition, the stage is adapted to leave the plate a certain range of motion in the observation axis.

Plates are generally made of poured or moulded material, usually polystyrene. For this reason, plates more often than not comprise defects in the flatness of their bottom surface forming the bottom of the wells. The size of such defects largely exceeds the depth of field of the objective. The difference between extreme points on the bottom surface commonly reaches 0.2 to 0.3 mm.

The defects in the flatness of the bottom surface of the plate and its deformation cause variations in the distance between the objective and the sample to be analysed. It is therefore necessary, in order to observe an entire plate or samples arranged in wells covering a large section of the plate surface, to frequently adjust the focus of the objective to compensate the variation in this distance.

This drawback is seen for example in standard fluorescence microscopes, equipped with a CCD camera and morphometric software. The same problem arises for phase contrast examination such as proposed by certain instruments.

Automatic focusing on this type of instrument is slow and unreliable: an empty well can cause instability of the system or even erroneous focusing on a fault in the external surface.

The need to frequently adjust the focus of the objective lowers the speed of image acquisition of the samples.

An analogous problem arises during the analysis of microparticles which are increasingly used as effectors of biochemical reactions, when such microparticles are deposited in the wells of a plate.

Likewise, the search for bacteria on filters requires frequent adjustment of the focus of the objective due to defects in the flatness of the filter.

Another drawback is the use of mercury and/or halogen lamps, which do not afford stable and uniform illumination.

BRIEF SUMMARY OF THE INVENTION

One object of the invention, in a first aspect, is to provide a solution to this problem of image acquision by proposing a device, notably of the microscope type, which can operate at high speed even with supports whose observation surface is not perfectly flat.

In this respect, the invention has as its object a device such as defined hereinabove, more particularly of the microscope type, wherein it comprises a spacer fixed relative to the objective and having a support surface on the support, said support surface being located proximate to the observation axis and the support being free along the vertical observation axis, such that it remains in contact with said spacer whose size is adapted to maintain, on the observation axis, a constant distance between the objective and the observation surface, during a relative displacement between the support and the observation axis.

The invention is also directed at facilitating the speed and quality of signal acquisition, and offering the possibility of exciting the sample over the entire field of analysis, without the need to sweep within a same sample.

In a second aspect, the invention equally provides a solution to the drawbacks of certain light sources used in the prior art which are costly (laser), unstable or of limited lifetime (mercury lamp).

According to other characteristics of the invention
the device comprises means for adjusting the distance between the objective and the support surface ; and
the support is a plate, notably a multiwell plate comprising 96, 384, 864 or 1536 wells.

Although the use of plates is the preferred mode of implementation, it is understood that the analytical or observation device according to the invention may be used with other supports such as membranes, filters, etc., more generally any support used by a man skilled in the art on which biological samples are deposited, notably any support not perfectly flat on which several samples to be analysed are placed.

According to yet other characteristics of the invention:

- the spacer comprises a sleeve extending along the observation axis, the support surface being formed by a ring-shaped area at the end of the sleeve;
- the means of acquisition and the means of illumination comprise means of self-calibration to make a uniformity correction of the illuminating beam based on observation of reference fluorescent beads arranged on the plate carrying the samples;
- the means of illumination are adapted to simultaneously cover most of the surface of a sample and the objective and the means of acquisition are adapted to give a field of observation simultaneously covering most of the sample surface;
- the means of illumination comprise at least one light source composed of a lamp, a laser, or a set of light-emitting diodes;
- said light source comprises light-emitting diodes emitting at at least two different wavelengths;
- the device comprises at least one lens allowing the light emitted by the source to converge on the sample or a part thereof;
- the device comprises a set of individual lenses, each being associated with a respective diode;
- the device comprises a lens, notably a Fresnel lens, positioned between the light-emitting diodes and the support;
- the device comprises a number of diodes adapted to bring on the object an illumination or lighting corresponding to a power of at least 2 mW; and/or
- the light-emitting diodes are arranged in a ring around the objective.

According to particular modes of embodiment of the invention:

- said light source is joined to the spacer.
- the spacer is positioned between the observation surface of the support and the objective, and has a support surface on the observation surface;
- the spacer is held by the objective;
- the objective is situated above the support, whereas the spacer is situated below the support in the observation axis, so that its support surface rests on the support surface opposite to the observation surface, and is joined to a part fixed relative to the objective;
- the means of illumination comprise means to guide the light beam through the spacer or the sleeve; and
- the means of guiding the light beam comprise an optical fiber.

Another object of the invention is a device for observation or analysis of one or more samples arranged on a support, of the type described hereinabove, wherein the means of illumination comprise a set of light-emitting diodes.

According to specific embodiments of the invention:

- said set comprises light-emitting diodes emitting at at least two different wavelengths;
- the device comprises at least one lens allowing the light emitted by said set of diodes to converge on the sample or a part thereof;
- the device comprises a set of individual lenses, each being associated with a respective diode;
- the device comprises a lens, notably a Fresnel lens, positioned between the light-emitting diodes and the support;
- the device comprises a number of diodes adapted to produce light corresponding to a power of at least 2 mW on the object; and
- the light-emitting diodes are arranged in a ring around the objective.

More particularly, the invention has as its object a microscope, notably a microscope for sequential observation of samples arranged (side by side) on a common plate, such as described hereinabove.

Thus this observation surface, free along the vertical axis, remains at a fixed distance from the objective in proximity to the optical axis, defined by the length of the spacer, which is adjusted so that the image of the objects located on the surface opposite the observation surface is focused on the detector.

The invention further has as its object a method for sequentially observing several samples arranged on a common support, notably on a common plate, more notably side by side, or more generally a method for analysing one or more samples, wherein it comprises the use of a device such as defined hereinabove.

The invention also relates to the use of a device such as defined hereinabove for analysing one or more samples, such as for example the analysis or detection of nucleic acids, polypeptides, lipids, organelles, etc., particularly for applications of research, diagnosis, industrial screening of product banks, etc.

BRIEF DESCRIPTION OF THE DRAWINGS

The invention will become more readily understood in the following description, which is given solely as an example and with reference to the figures in which:

FIG. 1 is a perspective schematic view of an analyser according to the invention;

FIG. 2 is a vertical cross-section schematic view containing the observation axis, in the region of the culture plate, of the analyser of FIG. 1 according to a first embodiment of the invention;

FIG. 3 is an analogous view of an objective and an objective cover forming the spacer, shown alone, according to a second embodiment of the invention;

FIG. 4 is an analogous view of an objective and an adjustable objective cover incorporating light sources (light-emitting diodes), according to a third embodiment of the invention.

DETAILED DESCRIPTION OF THE INVENTION

Figure 5:
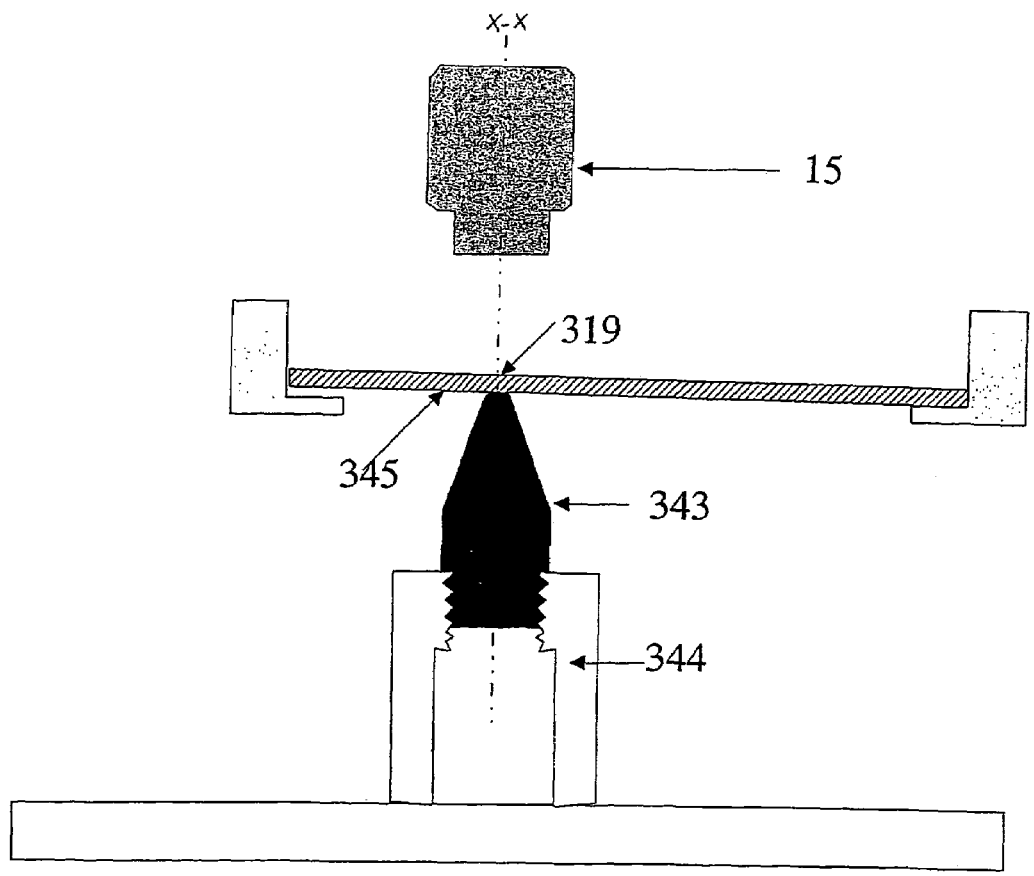
FIG. 5 is a vertical cross-section schematic view containing the observation axis of a microscope, and notably the associated spacer for keeping the focus, in an upright assembly configuration (observation from above), according to a fourth embodiment of the invention.

The analyser 11 depicted in FIG. 1 is intended more particularly for observing the fluorescence of samples (notably cells) contained in the wells of a titration (or culture) plate.

It comprises primarily a base 13 carrying an observation objective 15 and a stage 17 for positioning a titration plate 19 which leaves free the vertical displacements of the sample support, a source 21 of local illumination of the plate, a camera 23 placed behind the objective 15 and a data processing module 25, such as a microcomputer, connected to the camera 23.

Such microscope is useful for rapid observation of samples contained in adjacent wells 27 of the plate 19, as seen in FIG. 2.

As shown in FIG. 2, the plates used preferably comprise a continuous bottom surface 29 forming the bottom of the wells 27 and constituting an observation surface through which the samples are observed. The wells 27 open at the top surface of the plate. They are roughly cylindrical, with a circular or square cross-section and have a bottom that is essentially flat (lower part of the bottom of the wells). In FIG. 2, a cross-section of a plate containing 384 square wells approximately 3 mm per side was depicted, although the device can be adapted to any other size.

The plates used generally contain 96, 384, 864 or 1536 wells. Typical dimensions are 107 mm×71 mm, for example. Such plates are commercially available [Nunc (Denmark), Greiner (Germany), Costar, Falcon (U.S.A.), etc.].

Now we shall refer back to FIG. 1.

The base 13 is for example that of an inverted microscope equipped for epi-illumination. It comprises a turret 31 supporting the objective 15 so that its observation axis runs roughly vertically.

The objective 15 preferably has a low magnification for example comprised between 1.25 and 5. Advantageously, it has a magnification of 2.5 or 5. The magnification is adjusted to a value which, by default, is close to the ratio between the dimensions of the detector and those of the object, by lenses placed in the elongated ring which supports the detector. The objective has a large numerical aperture. In particular, the latter is adapted so that the field of observation of the objective covers the entire area of the bottom of a well.

The stage 17 is joined to the base 13. It is held roughly horizontally With respect to the objective 15. This stage comprises, as commonly known, a holding structure 33 attached to the base 13 and a support frame 35 for the plate 19. This frame extends in a plane roughly perpendicular to the observation axis. It can slide in this plane relative to the holding structure 33. In this respect, the frame is guided relative to the holding structure between pairs of sliders extending along two directions perpendicular of the plane. Two electrical gears ensure displacement of the frame 35 in these two directions. The frame is somewhat larger than the support, with a clearance of 0.1 mm or less, for example, to leave free the vertical movements.

The data processing unit 25 runs a program that controls the source 21, the camera 23, and the positioning stage 17. In particular, it ensures the successive placement of each sample on the plate in front of the objective and the acquisition of an image of each sample.

The unit 25 further runs software that processes and analyses the image acquired of each sample. This processing comprises for example primary processing, such as pixel diagrams and cluster analyses, as well as secondary processing such as excitation corrections, comparison between wells and statistics.

Moreover, the unit 25 can make a uniformity correction of the excitation light, based on reference fluorescent beads placed in one or several wells of the plate.

As illustrated in FIG. 2, the frame 35 has four sides 37 running along the contour of the plate 19. The dimensions of the sides 37 are adapted so that they are in close contact with the edges 39 of the plate, while allowing the plate 19 to move freely in the direction of the observation axis.

Internally, the frame 35 has a peripheral rim 41 forming a support surface for the plate 19 outside of observation periods. During observation periods, the plate 19 is away from this support surface or at most the plate rests only partially thereupon.

According to the invention, a sleeve 43 forming a spacer is joined to the objective 15. It prolongs the latter axially and, at its free end, forms a surface 45 to support the bottom surface of the plate 19 in immediate proximity to the bottom of the well containing the sample to be observed. The other end of the sleeve 43 rests on the end of the objective 15.

The sleeve 43 has a general truncated-cone shape. Internally it forms an axial channel 47 enabling the illumination and observation of the entire surface of a sample from the objective 15. The diameter of the channel gradually decreases from the end of the sleeve resting on the objective to the free end of the sleeve forming the support surface 45. Its diameter thus ranges from 12 mm to 4.5 mm. The height of the channel 47 is for example approximately 20 mm. It can range for example from 10 to 30 mm depending on the chosen objective.

The support surface 45 is flat and forms a ring-shaped support around the bottom of the well containing the sample to be observed.

At the end of the sleeve resting on the objective 15, the channel 47 has a shoulder 49 forming a ring-shaped surface on which the sleeve rests on the objective.

The source of illumination 21 is formed by a lamp, a laser or a set of light-emitting diodes. It is adapted so that it irradiates the sample leading the latter to emit a specific radiation through a phenomenon of fluorescence.

The fluorophores used are those for cellular labelling of the sample,-such as surface labelling, intramembrane labelling, cytoplasmic labelling, metabolic labelling (pH, respiration), non-specific or specific DNA and RNA labelling (Fish), or polypeptide labelling (enzymes, surface receptors, cytoplasmic or nuclear proteins, etc.), for example.

The laser used for the source 21 is for example a helium-neon laser with a wavelength of 543 nm, an argon laser with a wavelength equal to 488 nm, a solid state dual frequency laser with a wavelength equal to 532 nm or a laser diode with wavelength defined in a region from blue to red.

In a preferred embodiment, the source 21 is formed by an argon laser with a wavelength equal to 488 nm, the power of the laser being set at 25 mW.

A prism 51 to return the incident beam emitted by the source 21 is placed behind the objective 15 to direct the incident beam along the optical axis of the objective 15 in the direction of the sample. Thus, the excitation beam crosses the objective ensuring observation of the sample by epifluorescence. For reasons of clarity in FIG. 2, the optical axes of the source 21 and the camera 23 are shown as being parallel whereas in fact they are perpendicular to each other.

In one variant, the beam emitted by the source of illumination is guided to the sample by a mirror or optical fiber allowing illumination of the sample without crossing the objective.

The camera 23 advantageously comprises a matrix of charge coupled detectors, commonly called CCD detectors. It is sensitive to the radiation re-emitted by the sample through fluorescence and is adapted to produce an image representative of this radiation.

The camera is chosen so as to be able to acquire the complete image of a sample simultaneously, i.e. its field is large enough to cover the bottom of a well, taking into account the modification of the beam made by the objective 15.

In an advantageous manner the camera offers the possibility of adjusting the acquisition time and has a detector cooling device in order to reduce the background noise.

The camera is positioned with its optical axis perpendicular to the observation axis. An inclined prism or mirror 53 is placed behind the objective 15 to deviate the beam as it exits the objective towards the camera 23. A dichroic filter can also be inserted to eliminate excitation light.

Other assemblies are possible, where the axis of the camera coincides with that of observation, for instance.

To observe the contents of a plate, the means of positioning ensure a displacement of the plate in a plane perpendicular to the observation axis so as to successively bring each sample before the objective. During this displacement and during the actual observation of a sample, the plate is held, by its own weight, against the end of the sleeve 43. In fact, by virtue of its structure, the positioning stage allows a free clearance towards the top of the plate in the direction of the observation axis. The plate then rests at most only partially against the rim 41 of the stage.

During displacement of the plate under the action of the positioning mechanism, the plate slides on the support surface 45 formed at the end of the sleeve on which the plate rests.

During observation, the sample to be observed is located entirely inside the support area circumscribed by the sleeve on the observation surface of the plate, an area itself centered by the optical axis. Thus, the distance formed between the sample and the objective is the same for all the samples on the plate, regardless of the degree of flatness of the observation surface of the plate. In fact, this distance is fixed solely by the length of the sleeve 43.

In this manner, the objective does not have to be refocused by the autofocusing mechanism for each sample, which considerably reduces the total analysis time for the set of samples on a common plate.

Furthermore, as the field of observation of the camera 23 coincides with the field of excitation of the source 21, these latter covering the entire bottom of a well and therefore the entire sample surface, the complete image of a sample can be acquired simultaneously, without need to sweep the sample. Thus, image acquisition occurs rapidly.

In the variant illustrated in FIG. 3, the sleeve 143 is constituted of a first part 143A and a second part 143B, screwed together. The first part 143A of the sleeve 143 is attached to the objective 15. The first part 143A is adjustable and rests on the objective 15 while covering it, it is immobilised for example by means of a locking screw 144. It also has a threaded opening 146, centered on the observation axis X-X. The second part 143B, with an approximate truncated-cone shape, has a threaded base with a larger diameter, adapted to the threaded opening 146 of the first part 143A.

Thus, the distance between the support surface of the first part 143A of the sleeve 43 on the objective 15, and the support on the observation surface of the support can be adjusted with a precision better than the depth of field of the optic, 50 microns for example.

Using the locking screw 144 and the screw connection of the two parts 143A, 143B of sleeve 143, means for adjusting the distance between the objective 15 and the support surface 145 of the sleeve 143 on the support 19, have been described.

The height of the sleeve 143 is such that the position of the support surface 145 formed at its free end is very slightly higher than the position of the mean external surface of the bottom surface of plate 19, when this is resting on the rim 41 of the frame in the absence of the sleeve 143. The support surface 145 thus advantageously projects 0.3 to 0.5 mm relative to the mean plane of the bottom surface of the plate.

Under these conditions, the plate 19 still rests on the surface 145 of the sleeve. In particular, this support occurs in immediate proximity to the bottom of the well containing the sample to be observed. It takes place over the entire periphery of the bottom of the well under study, but at the exterior thereof, thereby leaving free the entire surface of the bottom for observation of the sample.

Refer now to FIG. 4 which shows another preferred embodiment, in which the light source is formed by a group of light-emitting diodes 261. The light emitted by these diodes is rendered approximately parallel by individual lenses 263, then is transmitted to the sample by a guidance system, preferably a Fresnel lens 267. Light-emitting diodes have been described for example in European application no EP 1031326, included in the present as reference, in the field of dentistry, for the polymerisation of resins.

In a surprising manner, it was found that such optical assemblies can be adapted to the illumination of samples according to the invention, and the invention described herein proposes, for the first time, the use of light-emitting diodes to illuminate a sample to be analysed. The advantages of this type of light source compared to the sources used in the prior art are numerous, such as notably the stable and monochromatic nature of the emitted light, the fact that the source is incoherent, avoiding problems of laser coherence that can cause interference or streaking, the simplicity of use, the immediate switching on, the possibility of using different wavelengths, etc.

Conventional light-emitting diodes have an emission power generally comprised between 2 and 10 mW, more typically between 3 and 5 mW. For a utilisation within the scope of the invention, the samples are preferably illuminated with a power of approximately 1 to 10 mW, so that a set of diodes according to the invention advantageously comprises from 2 to 50 diodes, more generally from 5 to 40 diodes, for example from 5 to 20 diodes. It is understood that the power of the diode device may be lower, notably on the order of 0.5 mW, in which case the exposure time of the sample is increased.

The spacer 243 is formed mainly of a support of light sources 269 and a truncated-cone-shaped cap 270, preferably in metal, in which the Fresnel lens 267 is mounted.

An especially advantageous embodiment consists in arranging the light-emitting diodes 261 in a ring around the objective 15 on the light sources support 269, said support 269 having a ring-shaped insert 271 positioned orthogonally relative to the observation axis X-X, on the objective 15. This results in easier separation of excitation light from fluorescence light. Advantageously, each diode 261 is surmounted by a lens 263 rendering the rays emitted by the diodes 261 parallel to each other.

In a preferred embodiment, the light-emitting diodes 261 emit at different wavelengths, and the same sample can be successively illuminated at different wavelengths. For example a first diode will be chosen which emits at 470±15 nm and a diode which emits at 550±15 nm to excite different fluorophores; In this case, the device comprises a set of 2 to 50 diodes of each desired wavelength.

The width of the incident beam hitting the bottom of the well containing the sample to be observed is such that the beam illuminates the entire surface of the well at the same time. Thus, the entire surface of the sample is excited simultaneously.

In the case of a ring-shaped assembly of the light source(s), the three axes—illumination, observation, and camera—can coincide.

Referring to FIG. 5, another embodiment of the invention will now be described.

This particular embodiment concerns samples which take the form of deposits regularly arranged on a filter or any other opaque support, and which are intended to be read from above rather than from below. In this case one uses a support 319 of constant thickness, on which the samples may be deposited directly or on which one places a filter membrane whereupon the samples have been placed beforehand. The optical devices are the same as for the reverse arrangement described in reference to the previous figures, whereas the device for keeping the focus consists of a rigid tip or spacer 343 sitting flush against the bottom of the support 319 and lifting it slightly. The tip 343 is fixed rigidly to a part fixed relative to the objective 15, for example to the base 344, thus making the distance between the samples and the objective 15 invariant. In this embodiment, the support surface 345 of the tip 343 on the support 319 rests on the surface of the support opposite the objective 15 and the observation surface.

It is understood that the spacer for maintaining a constant distance between the observation surface and the objective is analogous to that described in reference to FIG. 2.

The devices and methods of the invention may be used for analysing samples of different nature and origin, labelled by any technique familiar to the man skilled in the art. The samples may in particular comprise mammalian cells (animal or human, for example, nerve, tumor, immune cells, etc.), bacterial cells, plant cells, yeasts, cells of, pathogenic organisms, viruses, of, any biological specimen or sample, etc. The methods and devices are adapted to analysing or detecting polypeptides, nucleic acids, lipids, etc. They are especially useful for measuring the effect of test compounds, notably product banks, on cell populations, for example in high throughput testing of efficacy, selectivity or toxicity of products.

Thus, in a specific embodiment, the invention is equally directed to a method for high throughput analysis (or screening) using a device such as described hereinabove, more particularly in which the sample is composed of a population of cells placed in contact with a fluorescent label representative of a cellular function (e.g., proliferation, growth, maturation, differentiation, death, survival, apoptosis, etc.), the sample being placed in contact, in individual wells of a plate, with the compounds of a test collection, the compounds causing variations in the intensity of the fluorescence labelling being observed. The cell population is for example a population of neurons, particularly of human or animal origin.

In a particular embodiment, the fluorescent label is conjugated to an antibody associated with a cellular antigen. Such conjugated antibodies are commercially available, for example those produced by Immunotech (Marseilles, France).

In another method of implementation, the invention is based on a method for detecting the presence (or the quantity) of bacteria in one or more samples, comprising placing each sample in contact with a bacterial marker, and analysing the presence of labelling by means of a device such as described hereinabove. Such markers may be highly specific of the bacteria, such as nucleic acid probes specific of the bacterial genome associated with fluorescent labels, or non-specific such as acridine orange and all nucleic acid stains. These are readily available on the market, see for example the catalog from Molecular Probes (Eugene, Oreg., USA).

According to another embodiment, the invention is based on a method for detecting the presence (or the quantity) of a virus in one or more samples, comprising placing each sample in contact with a marker specific of the virus, and analysing the presence of labelling by means of a device such as described hereinabove.

According to further embodiment, the device comprises filters along the path of the fluorescence light which define spectral regions, for example dichroic filters at 530, 585 and 650 nanometers allowing the use of up to four different fluorescent labels, with a single excitation at 488 nm, as well as the practice of flow cytometry. Such labels enable the analysis of several parameters on a same cell. Similarly, the excitation beam may associate two sources, either simultaneously, by means of a dichroic mirror, or successively by means of an ordinary mobile mirror or yet by separation of the solid angles of excitation as described for the device with a ring-shaped source, which further expands the possibilities of multiparametric analysis. If the successive acquisitions occur without displacement of the sample, a pixel by pixel emissions correlation analysis may be carried out.

The invention can equally be used for analysing labelling on beads, particularly protein-protein interactions, immune complexes, hybridisations, etc.

The mode of acquisition at several wavelengths is especially advantageous here, since it allows several categories of particles to be distinguished. If these particles are homogeneous in size one may distinguish particles presenting quantified amounts of fluorescent label, for example about ten different levels. Such particles may be the site of analytical reactions, for example immunoanalysis, the reaction associated with each category of particle may be quantified by another marker, emitting at another wavelength, the same for all the reactions. In this manner as many different analytical reactions as there are distinguishable categories of particle may be recorded.

An additional use of this type of particle is coding, when they are associated with a combinatorial synthetic process. Analysis of the particles is the true reflection of the associated chemical compound, the identification being controlled outside the laboratory where the measurement was made, by means of electronic data transmission.

In another utilisation, a homogeneous population-of fluorescent particles is used to define a surface of correction for the excitation energy, which is not uniform over the entire field of observation; in particular, lasers display a gaussian energy distribution. Measurement of the energy re-emitted by each particle reflects the level of excitation energy at the point where that particle is located. With a small number of particles distributed randomly over the observed surface, it is possible to define, by interpolation, a surface which will then serve to normalise the pixel levels observed on unknown samples. A uniform emitting surface can also be used for this normalisation. This operation is necessary when one wants to quantify a reaction on a reactive particle or cell.

The invention may further be used to analyse nucleic acid deposits following hybridisation with probes, particularly on chips, microarrays, etc. In particular these may be deposits of DNA following hybridisation by corresponding DNA or RNA sequences, derived from a cell or a sample, and labelled with a fluorescent molecule. Such deposits are preferably regular arrangements of up to 5000 deposits that can be read all at once by the device. Several blocks of deposits placed side by side may be read sequentially.

Other features and advantages of the present invention will become apparent in the following examples, which should be considered as illustrative and in no way limiting.

EXAMPLE 1

Device According to the Invention Comprising

An Olympus IX-50 inverted microscope chassis equipped with an MWIB fluorescence cube and a UMPLFL 5× objective An argon laser emitting at 488 nm, 25 mW, from Spectra-Physics A cooled Hamamatsu C5985 camera and its controller. This camera has a wide range of acquisition times, from $10^{-4}$ second to 5 minutes. When used normally according to the invention the acquisition time is comprised between 0.1 and 1 second. Resolution is 376,151 pixels, 8-bit output, for 256 levels numbered from 0 to 255. The detector is cooled 20° C. below room temperature, ensuring a sensitivity of 10 photons.

A set of two Märshaüser tables 120×100 mm and their controller, from Lang.

A plate-holder frame set to hold Nunc 384-well plates and a black organic polymer plate cover to shield the plate from the laser beam and from ambient light.

An optic system to focus the laser beam, comprising two convergent lenses, a spatial filter (collimator) 30 microns in diameter.

A spacer in the form of a sleeve covering the objective, in black organic polymer.

A metallic plate supporting the different parts and the safety cowl ensuring cutoff of the laser beam if opened.

A PC microcomputer running AnalySIS software from Soft Imaging System (Munster, Germany).

EXAMPLE 2

Neuron Culture on 384-well Plates and Counting According to the Invention

After the dissection of the spinal cords from 14-day-old rat embryos, neurons are purified according to the method described in European patent application No. EP99403092.2.

The purified neurons are seeded using a Biomek 2000 robot into 384-well plates previously treated as described in the protocol.

As soon as the neurons adhere to the bottom of the wells (30 minutes to one hour later), the robot treats the cells with the test molecules.

After four days of culture, a survival test is performed consisting in treating the cultures with calcein-AM (Molecular Probes) which becomes fluorescent after penetration into living cells.

The fluorescence emitted by each cell present in the well is detected by an analyser according to the invention. Image acquisition on the 384 wells is done in an automated sequence, with an exposure time of 0.2 seconds per well, and then analysed automatically. The total run time is about 14 minutes. The result is displayed in tabular form showing the neuron counts per well. The following table presents a sampling of the count results, in comparison to the counts obtained visually using a phase contrast microscope, at selected regions corresponding to the contour and middle of the plate. The good agreement of the results bears witness to the regularity of focusing during automated analysis.

| Well No. | Manual | Automatic |
|---|---|---|
| 1 | 88 | 76 |
| 2 | 92 | 104 |
| 13 | 111 | 116 |
| 24 | 104 | 101 |
| 169 | 154 | 161 |
| 180 | 132 | 140 |
| 192 | 113 | 118 |
| 193 | 44 | 46 |
| 205 | 55 | 63 |
| 216 | 79 | 75 |
| 337 | 67 | 62 |
| 359 | 54 | 52 |
| 361 | 65 | 77 |
| 362 | 55 | 58 |
| 384 | 50 | 50 |

EXAMPLE 3

Counting of Fluorescent Beads According to the Invention

A suspension of fluorescent beads "Flow check fluorospheres" (Beckman Coulter, Miami, USA), calibrated to a diameter of 10 μm, is used. The beads are placed in the wells by a Biomek 2000 robot pipettor (Beckman) at a concentration of 50 beads per well, on average, in one-half of the plate (wells 1 to 192) and 100 beads per well, on average, in the other half of the plate (wells 193 to 384). The beads are allowed to settle and are then visually counted by the technician (10 wells per concentration, at different areas of the plate). The plate is then read by the analyser and the results are compared. It can be seen that the automated counts do indeed give the predicted mean values and that the standard deviation is fully consistent with a Poisson distribution. Wells which were visually counted are in perfect agreement with the automated count result.

| Well No. | Manual | Automatic |
|---|---|---|
| 1 | 31 | 32 |
| 2 | 43 | 47 |
| 13 | 65 | 55 |
| 23 | 64 | 62 |
| 24 | 55 | 60 |
| 36 | 62 | 56 |
| 48 | 41 | 40 |
| 169 | 68 | 62 |
| 181 | 56 | 50 |
| 204 | 111 | 99 |
| 359 | 116 | 108 |
| 360 | 128 | 121 |
| 361 | 96 | 90 |
| 373 | 99 | 89 |
| 383 | 88 | 82 |
| 384 | 135 | 124 |

EXAMPLE 4

Device According to the Invention Comprising

An Olympus IX-50 inverted microscope chassis equipped with an MWIB fluorescence filter cube, and a UplanFl 4×/0.13 objective.

A source comprising 20 blue light-emitting diodes, emitting at 470±15 nm, from Light Technologies, Marseilles, France, positioned behind the chassis at the spot where Olympus places a fluorescence excitation lamp.

A cooled Hamamatsu C5985 camera and its controller, identical to that in example 1.

An X-Y Prior Proscan 120×100 mm motorised table system and its controller, from Prior Instruments (Fulburn, UK).

An adjustable spacer covering the objective, in black anodised aluminium alloy.

A PC microcomputer running acquisition and counting software from Trophos (Marseilles, France).

The invention claimed is:

1. A device for observing or analyzing one or more samples or parts of samples arranged on a not perfectly flat sample(s) support (19, 319), said device comprising an objective (15) for observing at least part of a sample along an observation axis (X-X), means (21) for illuminating at least part of a sample and means (23; 25; 53) for acquiring an image at the objective (15) output, wherein said device further comprises:

a stage (17) comprising a peripheral rim adapted to hold the not perfectly flat sample(s) support (19; 319), said stage being also adapted to displace, in a plane perpendicular to the observation axis, the not perfectly flat sample(s) support (19; 319), said stage leaving free the displacement of the not perfectly flat sample(s) support (19; 319) along the observation axis, a spacer (43; 143; 243; 343) for maintaining a reliable and permanent focus of each observed sample or part of a sample, said spacer being positioned below the not perfectly flat sample(s) support and having an upper surface (45; 145; 345) on which the not perfectly flat sample(s) support (19; 319) takes support, said upper surface (45; 145; 345) being centered by the observation axis and circumscribing the observed sample or part of a sample and being adapted to remain in contact with a bottom surface of said not perfectly flat sample(s) support (19, 319), said spacer (43; 143; 243; 343) being positioned at a fixed position relative to the objective (15) so as to maintain, on the observation axis (X-X), a constant distance between the objective (15) and each observed sample or part of a sample arranged on the not perfectly flat sample(s) support (19; 319), while the not perfectly flat sample(s) support (19; 319) is being displaced in a plane perpendicular to the observation axis (X-X) by said stage.

2. Device according to claim 1, wherein said device further comprises means for adjusting (143A; 143B) and locking (144) the spacer at said fixed position relative to the objective (15).

3. Device according to claim 1, wherein said device is adapted for observing or analyzing one or more samples or parts of samples arranged on a plate comprising 96, 384, 864 or 1536 wells.

4. Device according to claim 1, wherein the spacer (43; 143; 243) comprises a sleeve extending along the observation axis (X-X), the upper surface of the spacer (43; 143; 243) being formed by a ring-shaped area (45; 145; 345) at the upper end of the sleeve.

5. Device according to claim 1, wherein the means for acquiring an image (23; 25; 53) and the means of illumination (21) comprise means of self-calibration to make a correction of uniformity of the illuminating beam based on the observation of reference fluorescent beads arranged on the plate holding the samples.

6. Device according to claim 1, wherein the means of illumination (21) are adapted to simultaneously cover most of the surface of a sample and wherein the objective (15) and the means of acquisition (23; 25; 53) are adapted to provide a field of observation simultaneously covering most of the surface of the sample.

7. Device according to claim 1, wherein the means of illumination (21) comprises at least one light source constituted of a lamp, or a laser.

8. Device according to claim 1, wherein the means of illumination comprises at least one light source constituted of a set of light-emitting diodes (261).

9. Device according to claim 8, wherein said light source comprises light-emitting diodes (261) emitting at least two different wavelengths.

10. Device according to claim 8 or 9, wherein it comprises at least one lens (263; 267) allowing the light emitted by the source to converge on the sample or a part thereof.

11. Device according to claim 10, wherein it comprises a set of individual lenses (263), each being associated with a respective diode (261).

12. Device according to claim 10, wherein it comprises a lens (267), notably a Fresnel lens, positioned between the light-emitting diodes (261) and the support (19).

13. Device according to claim 11, wherein it comprises a lens (267), notably a Fresnel lens, positioned between the light-emitting diodes (261) and the support (19).

14. Device according to claim 8, wherein it comprises a number of diodes (261) adapted to bring on the object a light corresponding to a power of at least 2 mW.

15. Device according to claim 8, wherein the light-emitting diodes (261) are arranged in a ring around the objective (15).

16. Device according to claim 7 or 8, wherein said light source (261) is joined to the spacer (243).

17. Device according to claim 4, wherein the spacer (43; 143; 243) is positioned between the not perfectly flat sample(s) support (19) and the objective (15).

18. Device according to claim 17, wherein the spacer (43; 143; 243) is held by the objective (15).

19. Device according to claim 1, wherein the objective (15) is positioned above the not perfectly flat sample(s) support (319), whereas the spacer (343) is positioned below the not perfectly flat sample(s) support (19) in the observation axis (X-X), so that the not perfectly flat sample(s) support rests on the upper support surface of the spacer (343), and where the spacer is joined to a part (344) fixed relative to the objective (15).

20. Device according to claim 1, wherein the means of illumination comprises means (51) for guiding the light beam through the spacer (43).

21. Device according to claim 20, wherein the means for guiding the light beam comprises an optical fiber.

22. Device according to claim 1, wherein it is constituted of a microscope (11), particularly a microscope for sequential observation of several samples placed side by side.

23. Method for sequentially observing several samples arranged side by side on a common support (19; 319), wherein said method comprises the following steps:

samples are arranged on a common support;

said common support is positioned in a device according to claim 1; and said samples are observed.

24. Method according to claim 23, for analyzing or detecting cells or particles having reacted with polypeptides, lipids or nucleic acids.

25. Method according to claim 23, for analyzing a series of samples of cell populations which one wishes to count, perform viability tests or tests of antigen expression, or morphometric tests, in static or kinetic mode.

26. Method according to claim 23, for analyzing a series of samples in which one seeks to count bacteria.

27. Method according to claim 23, for analyzing a series of samples containing different categories of microbeads, each category serving as the support for an analytical reaction with said sample.

28. Method according to claim 23, for analyzing a series of samples having arrangements of DNA deposits, on which nucleic probes from said sample have reacted, such probes being made fluorescent either before or after hybridization.

* * * * *

UNITED STATES PATENT AND TRADEMARK OFFICE
CERTIFICATE OF CORRECTION

PATENT NO. : 7,372,626 B2  
APPLICATION NO. : 10/276245  
DATED : May 13, 2008  
INVENTOR(S) : Villa et al.

Page 1 of 1

It is certified that error appears in the above-identified patent and that said Letters Patent is hereby corrected as shown below:

On the Title Page, Item (75) in the listing of the inventors, <u>to include</u> Pierre DELAAGE, as follows:

Item (75) Inventors: Pascal Villa, Cassis (FR); Michel Delaage, Marseille (FR); Toni Williamson, Cassis (FR); Pierre Delaage, Marseille (FR)

Signed and Sealed this

Fourteenth Day of July, 2009

JOHN DOLL  
*Acting Director of the United States Patent and Trademark Office*